United States Patent [19]

Goel

[11] Patent Number: 4,600,763

[45] Date of Patent: Jul. 15, 1986

[54] INTERPOLYMERS OF BICYCLIC AMIDE ACETALS/DICARBOXYLIC ACID ANHYDRIDES/POLYEPOXIDES

[75] Inventor: Anil Goel, Worthington, Ohio

[73] Assignee: Ashland Oil, Inc., Ashland, Ky.

[21] Appl. No.: 772,821

[22] Filed: Sep. 5, 1985

[51] Int. Cl.$^4$ .............................................. C08G 59/40
[52] U.S. Cl. .................................. 528/111; 528/113; 528/117; 528/341
[58] Field of Search ................ 528/111, 113, 117, 341

[56] References Cited

U.S. PATENT DOCUMENTS

| | | |
|---|---|---|
| 3,507,830 | 4/1970 | Feinauer .............................. 260/47 |
| 3,673,274 | 6/1972 | Tomalia et al. ................. 528/113 X |
| 3,714,196 | 1/1973 | Zondler et al. ................. 528/111 X |
| 3,822,237 | 7/1974 | Alford et al. ................... 528/111 X |
| 4,327,200 | 4/1982 | Leitner et al. .................. 528/111 X |
| 4,480,083 | 10/1984 | Tortorello et al. ................. 528/111 |
| 4,540,767 | 9/1985 | Goel ..................................... 528/60 |

Primary Examiner—Earl Nielsen
Attorney, Agent, or Firm—John F. Jones

[57] ABSTRACT

A process for the production of novel polymers by the interpolymerization of a bicyclic amide acetal, a dicarboxylic acid anhydride and a polyepoxide at a temperature in the range of from 80° C. to about 200° C. and at a pressure in the range of from about ambient to about 50 atmospheres is described.

8 Claims, No Drawings

INTERPOLYMERS OF BICYCLIC AMIDE ACETALS/DICARBOXYLIC ACID ANHYDRIDES/POLYEPOXIDES

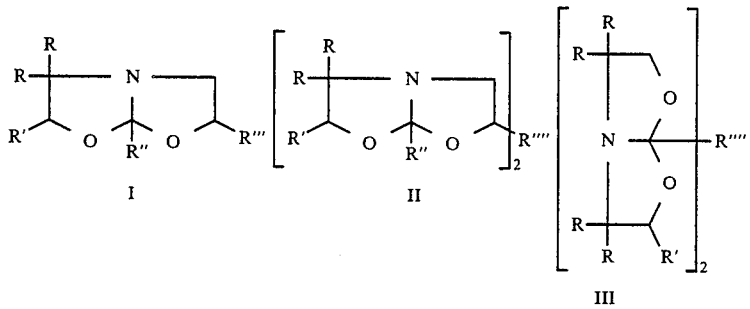

This invention relates to the preparation of novel interpolymers of bicyclic amide acetals, dicarboxylic acid anhydrides and polyepoxides and to the process for preparing them. The novel interpolymers of this invention have excellent physical properties including impact strength, flexural strength and the like and the polymerization process for producing them is suitable for use in applications such as in reaction injection molding (RIM).

The formation of linear poly(ester-amides) by the reaction of bicyclic amide acetals with dicarboxylic acid anhydrides has been described in U.S. Pat. No. 3,507,83. The formation of thermoset polymers, particularly those obtained from the reaction of dicarboxylic acid anhydrides with a mixture of bicyclic amide acetal and polyepoxide, has not previously been described.

The process for preparing thermoset polymers by reaction of polyepoxides with carboxylic anhydrides is slow and requires high reaction temperatures. The polymers obtained in such a manner are generally brittle. In the process of this invention the interpolymerization of polyepoxides, dicarboxyclic acid anhydrides and bicyclic amide acetals produce thermoset polymers having excellent physical properties.

In the known copolymerization of polyepoxides with dicarboxylic acid anhydrides to give thermoset polyester polymers the polymerization is slow and is usually carried out in the presence of catalysts such as tertiary amines, phosphines, and the like at high reaction temperatures. The polymers obtained are usually brittle. In order to improve the toughness of these polymers flexible additives such as rubber, thermoplastics, and the like have been added. I have discovered that the addition of a bicyclic amide acetal to the polyepoxide-dicarboxylic acid anhydride polymerization can improve significantly the polymerization rate and the physical properties of the resulting polymer. It is believed that new hybrid poly(ester-amide) polymers are formed by the sequential or simultaneous polymerization of dicarboxylic acid anhydrides with bicyclic amide acetaals and polyepoxides. These polymers have been found to have improved physical properties such as toughness (impact strength), flexural strength and the like. In the process of this invention the polymerization rate is improved to such an extent that the process has become suitable for applications such as RIM, adhesives, composites, and the like. The bicyclic amide acetal has been considered to be bifunctional (similar to the epoxide group) in the process of this invention and each of these groups reacts with one dicarboxylic anhydride group.

The bicyclic amide acetals useful in this invention include those conforming to Formula I, II or III.

wherein R, R', R" and R''' independently represent hydrogen, an alkyl group having from 1 to 20 carbon atoms, an aryl group having from 6 to 12 carbon atoms, an alkaryl group having from 7 to 20 carbon atoms, an alkyl or aryl ether group having from 1 to 20 carbon atoms, and R'''' represents an alkylene or arylene ether group having from 1 to 20 carbon atoms, an arylene alkarylene group having from 6 to 20 carbon atoms.

The polyepoxides useful in this invention can be monomeric or polymeric, saturated or unsaturated, aliphatic, cycloaliphatic, aromatic or heterocyclic, and they may be substituted if desired with other substituents besides the epoxy groups, e.g., hydroxyl groups, ether radicals, halogen atoms, and the like. Typical epoxy components suitable in the practice of this invention include those disclosed in U.S. Pat. No's. 2,500,600 and 2,334,483 which are incorporated here by reference. Preferred in this invention are 1,2-epoxy compounds having an epoxide equivalence greater than 1, that is to say, compounds containing more than one group of the formula

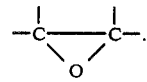

The 1,2-epoxide groups may be either terminal or inner ones. Particularly suitable terminal 1,2-epoxide groups are 1,2-epoxy ethyl or 1,2-epoxy propyl groups. The latter may be linked to an oxygen atom, that is to say, they are glycidyl ether or glycidyl ester groups. Compounds with inner epoxide groups usually contain the 1,2-epoxide group in an aliphatic chain or in a cycloaliphatic ring.

As epoxy compounds containing an inner 1,2-epoxy group there are suitable epoxidized diolefins, dienes, or cyclic dienes, such as 1,2,5,6-diepoxy hexane, 1,2,4,5-diepoxide, vinyl cyclohexene diepoxide, epoxidized diolefinically unsaturated carboxylic acid esters, such as methyl 9,10,12,13-diepoxystearate or the dimethyl ester of 6,7,10,11-diepoxyhexadecane-1,16-dicarboxylic acid. Furthermore, there may be mentioned epoxidized mono, di, or polyesters, mono-di- or poly-acetals containing at least one cycloaliphatic 5-membered or 6-membered ring, to which at least two 1,2-epoxidized groups are linked.

A widely used class of polyepoxides which can be used in the present invention are the epoxy polyethers obtained by reacting a halogen containing epoxide or dihalohydrin, such as epichlorohydrin, epibromohydrin, 3-chloro-1,2-epoxyoctane, and the like with either a polyhydric phenol or a polyhydric alcohol.

The anhydrides of dicarboxylic acids which are useful in this invention include maleic anhydride, succinnic anhydride, glutaric anhydride, phthalic anhydride, tetra hydro phthalic anhydride, hexahydro phathalic anhydride, maleic anhydride adduct of cyclopentadiene or methylcyclopentadiene anhydride, alkyl and alkenyl succinnic anhydride, citraconic anhydride and mixtures thereof. Other typical anhydrides which may be employed are described in U.S. Pat. No. 3,329,652.

In the process of this invention the amounts of bicyclic amide acetal used may be in the range of from 1 to 99% by weight based on the weight of polyepoxide and bicyclic amide acetal present. The equivalent amount of the dicarboxylic acid anhydride used in the process of this invention with respect to the combined equivalents of polyepoxide and bicyclic amide acetal should be in the range of 1:0.5 to 1:2. The polymerization process can be carried out in the temperature range of 80 degrees C. to about 200 degrees C. at pressures in the range of from about ambient pressure to about 50 atmospheres. Catalysts such as tertiary amines, phosphines, tetraalkyl ammonium salts, and the like may be used in the process of this invention.

The polymerization process of this invention can be carried out in more than one way. For instance, the bicyclic amide acetal which may contain a catalyst can be added to the premixed solution of polyepoxide and dicarboxylic acid anhydride. The solutions of polyepoxides and certain dicarboxylic acid anhydrides are stable at room temperature to about 60 degrees C. for from several hours to several days. Typically, when a room temperature solution of bicyclic amide acetal and tertiary phosphine catalyst is added to the mixture of polyepoxide and dicarboxylic acid anhydride and the temperature is raised to 120 degrees C. polymerization occurred in about one minute to give the gelled, thermoset polymer. Alternatively, a mixture of bicyclic amide acetal and polyepoxide which has a shelf life at room temperature of over one month can be mixed with a dicarboxylic anhydride to give rapid polymerization.

This invention is further illustrated in the following representative examples.

EXAMPLE 1

This comparative example is outside the scope of this invention. Liquid diglycidyl ether of Bisphenol-A (epoxy equivalent weight of 185,4.0 g) and 2.4 g of 5-norbornene-2,2-dicarboxylic anhydride were mixed and heated at 100–110 degrees C. for ten minutes. The mixture remained in the liquid state. To this was then added 0.04 g of triphenyl phosphine catalyst and the mixture was heated to 120 degrees C. In about 10 minutes at this temperature gelation of the mixture occurred yielding a solid polymer.

EXAMPLE 2

This example demonstrates that the use of a bicyclic amide acetal in the process of Example 1 results in rapid gelation to give a solid polymer. A mixture of the polyepoxide of Example 1 (4.1 g) and 5-norbornene-2,2-dicarboxylic anhydride (NBDA) (5.6 g) was heated at 120 degrees C. To this was added a solution of 0.04 g of triphenyl phosphine in 1.65 g of bicyclic amide acetal of Formula 1 in which R, R' and R''' represent hydrogen and R'' represents methyl. A rapid reaction occurred within a few seconds after the addition of the bicyclic amide acetal and the color changed from pale yellow to dark red with a significant increase in viscosity. The mixture became completely gelled in about one minute to give a solid polymer.

EXAMPLE 3

The procedure of Example 2 was followed using 3.74 g of the polyepoxide of Example 1, 1.81 g of phthalic anhydride, 1.85 g of hexahydrophthalic anhydride, 0.65 g of the bicyclic amide acetal of Example 2 and 0.05 g of triphenyl phosphine. A rapid polymerization occurred at 120 degrees C. within one minute to give a dark red solid polymer.

EXAMPLE 4

This example is outside the scope of this invention and is for the purpose of comparison. A liquid diglycidyl ether of Bisphenol-A (40.02 g) and 0.4 g of triphenyl phosphine were mixed and degassed on a rotary evaporator at about 60 degrees C. This viscous liquid was then mixed with 24.07 g of degassed 5-norbornene-2,2-dicarboxylic anhydride. The resulting mixture was poured into a mold prepared by using two silicone mold release coated glass plates held apart in a parallel fashion by ⅛ inch spacers. The mold was kept in an oven at 130 degrees C. for 40 minutes. Polymerization occurred in about 25 minutes. The resulting polymer was postcured at 160 degrees C. for about 30 minutes. The resulting solid polymer was found to have a notched izod impact strength (ASTM D 256) of 0.2 foot pounds/inch of notch, an unnotched izod impact strength of 2.67 foot pounds/inch, a flexural strength (ASTM D 790) of 18,690 psi, a flexurasl modulus of 507,279 psi and a heat distortion temperature (ASTM D 648) of 85 degrees C.

EXAMPLE 5

This example demonstrates that the addition of a bicyclic amide acetal to the procedure of Example 4 results in the rapid formation of a hybrid poly(esteramide) polymer with improved toughness (impact strength and flexural strength). Liquid diglycidyl ether of Bisphenol-A (41 g) and 56 g of NBDA were mixed and degassed at 60 degrees C. on a rotary evaporator. The resulting mixture was mixed rapidly with a solution of 16.5 g of the bicyclic amide acetal of Example 2 and 0.4 g of triphenyl phosphine and the resulting mixture was poured into the mold described in Example 4. The curing procedure of Example 4 was followed. Polymerization occurred within five minutes. The solid polymer obtained after 30 minutes of postcuring at 160 degrees C. was found to have a notched izod impact strength of 0.3 foot pounds/inch of notch, an unnotched izod impact strength of 4.9 foot pounds/inch, a flexural strength of 21,401 psi, a flexural modulus of 496,769 psi, and a heat distortion temperature of 99 degrees C.

EXAMPLE 6

The procedure of Example 5 was followed using 20.23 g of liquid diglycidyl ether of Bisphenol-A, 33.32 g of the diglycidyl ether of polypropylene glycol (epoxy equivalent weight of about 320), 43.55 g of NBDA, 8.9 g of the bicyclic amide acetal and 0.5 g of triphenyl phosphine. The resulting polymer was found to have a notched izod impact of greater than 14 foot pounds/inch of notch.

EXAMPLE 7

The procedure of Example 5 was followed using 40 g of liquid DGEBA, 42 g of hexahydrophthalic anhydride, 8.2 g of bicyclic amide acetal of Example 2 and 0.5 g of triphenyl phosphine. The polymerization occurred within ten minutes and the postcured polymer was found to have a notched izod impact strength of 0.4 foot pounds/inch of notch, an unnotched izod impact strength of 5.4 foot pounds/inch, a flexural strength of 13,883 psi, a flexural modulus of 413,590 psi and a heat distortion temperature of 103 degrees C.

EXAMPLE 8

The procedure of Example 5 was followed using 41 g of liquid diglycidyl ether of Bisphenol-A, 20.3 g of hexahydrophthalic anhydride, 25.2 g of NBDA, 8.2 g of the bicyclic amide acetal of Example 2 and 0.4 g of triphenyl phosphine. The polymerization occurred within seven minutes and the postcured polymer was found to have a notched izod impact strength of 0.32 foot pounds/inch of notch, a flexural strength of 20,841 psi, a flexural modulus of 481,523 psi and a heat distortion temperature of 97.4 degrees C.

EXAMPLE 9

The procedure of Example 5 was followed using 40.1 g of the liquid diglycidyl ether of Bisphenol-A, 23.66 g of NBDA, 19 g of phthalic anhydride, 8.2 g of the bicyclic amide acetal of Example 2 and 0.4 g of triphenyl phosphine. The polymerization occurred within five minutes and the postcured polymer was found to have a notched izod impact strength of 0.8 foot pounds/inch of notch, a flexural strength of 22,238 psi, a flexural modulus of 508,034 psi and a heat distortion temperature of 97.4 degrees C.

EXAMPLE 10

The procedure of Example 5 was followed using 39 g of liquid diglydidyl ether of Bisphenol-A, 85.4 g of polyisobutyl succinic anhydride (anhydride equivalent weight of 342), 7 g of the bicyclic amide acetal of Example 2 and 0.5 g of triphenyl phosphine. Polymerization occurred within ten minutes and the postcured polymer was found to have a notched izod impact strength of 0.7 foot pounds/inch of notch and an unnotched izod impact strength of 10 foot pounds/inch.

EXAMPLE 11

Liquid diglycidyl ether of Bisphenol-A (90 g) was reacted with 10 g of carboxylic terminated acrylonitrile/butadiene (18%/82%/ by weight) copolymer in the presence of 0.2 g of triphenyl phosphine at 110–120 degrees C. for one hour to form a polyepoxide. The procedure of Example 5 was followed using 45 g of the above polyepoxide, 46 g of NBDA, 8.3 g of the bicyclic amide acetal of Example 2 and 0.4 g of triphenyl phosphine. Polymerization occurred within ten minutes and the postcured polymer was found to have a notched izod impact strength of 0.4 foot pounds/inch of notch, an unnotched izod impact strength of 4.2 foot pounds/inch, a flexural strength of 18,063 psi, a flexural modulus of 433,977 psi and a heat distortion temperature of 100 degrees C.

EXAMPLE 12

The procedure of Example 5 was followed using 40 g of liquid diglycidyl ether of Bisphenol-A, 23 g of NBDA, 19 g of phthalic anhydride, 10.5 g of a bicyclic amide acetal of Formula I in which R and R' are hydrogen, R" is ethyl and R''' is $CH_2OCH_2CH=CH_2$, and 0.4 g of triphenyl phosphine. The resulting polymer was found to have a notched izod impact strength of 0.4 foot pounds/inch of notch, a flexual strength of 21,532 psi and a flexural modulus of 497,478 psi.

I claim:

1. The process comprising the interpolymerization of a bicyclic amide acetal, a dicarboxylic acid anhydride and a polyepoxide in the temperature range of from 80° C. to about 200° C. at a pressure in the range of from about ambient pressure to about 50 atmospheres.

2. The process of claim 1 wherein the bicyclic amide acetal is present in from 1 to 99% by weight based on the weight of polyepoxide and the equivalent weight of dicarboxylic acid anhydride with respect to the combined equivalents of bicyclic amide acetal and polyepoxide is in the range of 1:0.5 to 1:2.

3. The process of claim 2 wherein the bicyclic amide acetal is one of Formula I, II or III.

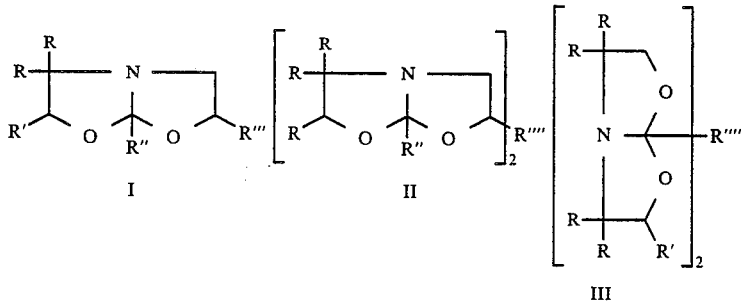

wherein R, R', R" and R''' independently represent hydrogen, an alkyl group having from 1 to 20 carbon atoms, an aryl group having from 6 to 12 carbon atoms, an alkaryl group having from 7 to 20 carbon atoms, an alkyl or aryl ether group having from 1 to 20 carbon atoms and R'''' represents an alkylene or arylene ether group having from 1 to 20 carbon atoms, an arylene or an alkarylene group having from 6 to 20 carbon atoms.

4. The process of claim 3 wherein the anhydride of a discarboxylic acid is selected from the group consisting of maleic anhydride, succinic anhydride, glutaric anhydride, phthalic anhydride, tetrahydrophthalic anhydride, hexahydrophthalic anhydride, norbornene-2,2-dicarboxylic anhydride, the maleic anhydride adduct of cyclopentadiene, methyl cyclopentadiene anhydride, alkyl and alkylene succinic anhydrides, citraconic anhydride and mixtures thereof.

5. The process of claim 4 wherein the polyepoxide is a compound containing more than one group of the formula

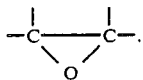

6. The process of claim 5 wherein the bicyclic amide acetal is one of Formula I in which R, R' and R''' are hydrogen and R'' is methyl, the polyepoxide is the liquid diglycidyl ether of Bisphenol-A and the dicarboxylic acid anhydride is 5-norbornene-2,2-dicarboxylic anhydride.

7. The process of claim 5 wherein the bicyclic amide acetal is one of Formula I in which R, R' and R''' are hydrogen and R is methyl, the polypoxide is the liquid diglycidyl ether of Bisphenol-A and the dicarboxylic anhydride is a mixture of phthalic anhydride and hexahydrophthalic anhydride.

8. The polymer produced by the process of claim 1.

* * * * *